(12) United States Patent
Abts et al.

(10) Patent No.: US 9,661,808 B2
(45) Date of Patent: May 30, 2017

(54) IRRIGATION SYSTEM WITH DUAL-CONTROLLER DRIVE ASSEMBLIES

(71) Applicant: Irrovation LLC, Omaha, NE (US)

(72) Inventors: Kevin J. Abts, Omaha, NE (US); Gerald L. Abts, Denver, CO (US)

(73) Assignee: Irrovation LLC, Omaha, NE (US)

( * ) Notice: Subject to any disclaimer, the term of this patent is extended or adjusted under 35 U.S.C. 154(b) by 102 days.

(21) Appl. No.: 14/611,900

(22) Filed: Feb. 2, 2015

(65) Prior Publication Data

US 2015/0351335 A1    Dec. 10, 2015

Related U.S. Application Data

(60) Provisional application No. 62/008,545, filed on Jun. 6, 2014.

(51) Int. Cl.
*A01G 25/00* (2006.01)
*A01G 25/09* (2006.01)

(52) U.S. Cl.
CPC ................... *A01G 25/092* (2013.01)

(58) Field of Classification Search
CPC ....... A01G 25/00; A01G 25/09; A01G 25/092
USPC .................................. 239/723–749
See application file for complete search history.

(56) References Cited

U.S. PATENT DOCUMENTS

| | | |
|---|---|---|
| 4,580,731 A | 4/1986 | Kegel et al. |
| 5,255,857 A | 10/1993 | Hunt |
| 6,007,004 A | 12/1999 | Unruh |
| 6,337,971 B1 | 1/2002 | Abts |
| 6,755,362 B2 | 6/2004 | Krieger et al. |
| 6,820,828 B1 | 11/2004 | Greenwalt |
| 7,384,008 B1 | 6/2008 | Malsam |
| 7,584,053 B2 | 9/2009 | Abts |
| 8,849,468 B2 | 9/2014 | Abts et al. |
| 2002/0008167 A1 | 1/2002 | Haberland et al. |
| 2003/0066912 A1 | 4/2003 | Krieger et al. |
| 2004/0093912 A1 | 5/2004 | Krieger et al. |
| 2006/0027677 A1 | 2/2006 | Abts |
| 2007/0267524 A1 | 11/2007 | Mack |
| 2010/0032493 A1 | 2/2010 | Abts et al. |

(Continued)

OTHER PUBLICATIONS

St. Pierre, Conrad, Combine Variable Frequency and Fixed-Speed Drives for Better Economy, Apr. 1, 2000, Electrical Power Consultants, LLC, p. 1-3.*

*Primary Examiner* — Arthur O Hall
*Assistant Examiner* — Viet Le
(74) *Attorney, Agent, or Firm* — Dorr, Carson & Birney PC

(57) ABSTRACT

An irrigation system that includes multiple interconnected spans that are supported by multiple tower structures. Each intermediate tower structure and end tower structure may include a dual-controller drive assembly that may include both a fixed-speed drive controller controlling the speed of movement of the dual-controller drive assembly when the fixed-speed drive controller is selected and a variable-speed drive controller controlling the speed of movement of the dual-controller drive assembly when the variable-speed drive controller is selected, and one or more selector switches configured to either manually, based on manual operator input, or automatically, based on automatic sensor input, select between the fixed-speed drive controller and the variable-speed drive controller.

16 Claims, 14 Drawing Sheets

(56) References Cited

U.S. PATENT DOCUMENTS

| | | | |
|---|---|---|---|
| 2011/0181226 A1* | 7/2011 | Steiner | H02P 13/06 318/519 |
| 2012/0053776 A1* | 3/2012 | Malsam | A01G 25/092 701/27 |
| 2013/0018553 A1 | 1/2013 | Malsam | |
| 2013/0211717 A1 | 8/2013 | Abts | |
| 2013/0253752 A1 | 9/2013 | Grabow | |
| 2014/0225747 A1 | 8/2014 | Abts | |

* cited by examiner

IRRIGATION SYSTEM WITH DUAL-CONTROLLER DRIVE ASSEMBLIES

RELATED APPLICATIONS

The present application is based on and claims priority to U.S. Provisional Patent Application 62/008,545, filed on Jun. 6, 2014, which is hereby incorporated by reference in its entirety.

BACKGROUND OF THE INVENTION

Field of the Invention

The present invention relates to an irrigation system with dual-controller drive assemblies and more particularly pertains to a new system of using one or more selector switches to select between a fixed-speed drive controller controlling the speed of movement of a dual-controller drive assembly when the fixed-speed drive controller is selected and a variable-speed drive controller controlling the speed of movement of a dual-controller drive assembly when the variable-speed drive controller is selected. Such selector switches configured to be actuated either manually, based on manual operator input, or automatically, based on automatic sensor input, and to select between the fixed-speed drive controller and the variable-speed drive controller.

Description of the Prior Art

Mechanized irrigation systems, such as center pivot or lateral move irrigation systems, typically employ a series of pipe spans supported above a ground surface by tower structures that may include wheels or crawler tracks mounted on the tower structures, that are driven to advance the spans about a field in either a forward movement direction or a reverse movement direction. For the purposes of the present invention, the mechanized irrigation system will be referred to as the irrigation system and the pipes and the tower structures supporting the pipes will be referred to collectively as spans. Each of the spans move relatively independently of the other spans, and the movement of the spans is often performed in a follow the leader type manner in which an end span initially advances in either a forward movement direction or reverse movement direction of the irrigation system, and the remaining intermediate spans follow thereafter.

The forward movement direction or reverse movement direction of the irrigation system is dependent on either a clockwise rotation or counter clockwise rotation of the central shafts of the rotors of the span motors connected to reduction gearboxes that drive the rotation of the wheels contacting the ground surface. The direction of the rotation of the central shafts of the rotors of the span motors are conventionally controlled by conductors supplying power, typically, 3-phase, 480 volt AC (alternating current), to the span motors. Conventional 3-phase induction motors provide inherently high starting torques and high efficiency in operation, typically at 60 Hz (cycles per second), on irrigation systems of the prior art and such motors may also be used as the 3-phase span motors of the present invention.

In the case of 3-phase span motors as conventionally used on center pivots, such span motors typically operate at a fixed span motor RPM (revolutions per minute) of approximately 1,750. Gear reduction is provided to achieve a pace of movement over the ground of the wheels of about 0.8 wheel RPM. Such span motors can also easily be reversed (e.g., clockwise rotation of the central shafts of the rotors of the span motors to counterclockwise rotation of the central shafts of the rotors of the span motors). Reversal of the rotation of the central shafts of the rotors of the span motors is accomplished by simply reconfiguring the connections of any two of the three conductors L1, L2, L3 of the 3-phase supply power using a conventional electromechanical contactor device, typically located at a central control panel (not shown). This feature of 3-phase motors facilitates selecting a clockwise rotation or counter clockwise rotation of the central shafts of the rotors of the span motors, and, in turn, selecting either a forward movement direction or reverse movement direction of the irrigation system. A change in either the forward movement direction or reverse movement direction of the irrigation system is controlled conventionally for both the prior art and for the present invention by simply reconfiguring the connections of any two of the three conductors L1, L2, L3 of the 3-phase supply power.

Another convention of irrigation systems for the prior art is the use fixed-speed drive assemblies that may include an alignment detector with one or more single-pole, double-throw (SPDT) switches that are wired to receive either a forward movement direction signal or a reverse movement direction signal depending on either a forward movement direction or a reverse movement direction. These typical SPDT switches control the span motors of the fixed-speed drive assembly on and off while the irrigation system is moving in either a forward movement direction or a reverse movement direction. The discrete forward and reverse movement direction signals are communicated to the switches that each serve to signal two distinct states of alignment to control the 3-phase span motors on and off using a fixed-speed drive controller (e.g., electromechanical contactor or motor starter) of the fixed-speed drive assembly. Such forward and reverse movement direction signals are typically communicated to the switches using separately configured circuits as compared to the three conductors L1, L2, L3 of the 3-phase supply power that are configured to supply electrical power to the span motors.

In an example of the prior art, a forward movement direction signal may be present in a forward movement direction, and a reverse direction signal may be present in a reverse movement direction. In operation, conventional center pivot controls include both a forward movement direction signal and a reverse movement direction signal; however, only one of the two movement direction signals is present in a respective movement direction. Furthermore, the respective forward movement direction signal and reverse movement direction signal are each typically configured to cause the switches to signal the fixed-speed drive controller to control the span motors on and off in an opposite manner with regard to maintaining span alignment. For example, with the same state of alignment, a forward movement direction signal may be configured by the fixed-speed drive controller to control the span motor on and a reverse movement direction signal may be configured by the fixed-speed drive controller to control the span motor off.

The span motor of an intermediate span is typically controlled from span motor on to span motor off and span motor off to span motor on by a fixed-speed drive controller that monitors the output of the corresponding alignment detector that may include a single-pole, double-throw switch. Conventionally, in the prior art, the span motor RPM is not varied other than when the span motor is controlled from span motor on to span motor off and span motor off to span motor on. Such switch signals a discrete (i.e., binary logic, or two-state) on/off signal switch state to cycle control the span motor in an on/off manner. The switch may be located at spans adjacent to the flexible junctures where adjacent spans are interconnected. Relative movement of adjacent spans actuates these switches and, for example, enables the signaling of two distinct states of alignment of adjacent interconnected spans, such as that caused by the forward movement of an outer span about the flexible juncture of two adjacent spans. For example, the wheels of a lagging intermediate tower structure are driven in a forward movement direction by the rotation of one or more cams, rotated by one or more rods (e.g., mechanical linkage), that rotate against the roller-actuating arm of a corresponding switch that causes the internal contacts of the respective switch to close in a conventional single-pole, double-throw method that results in an "on" signal switch state controlling the 3-phase span motor on. Furthermore, in this example, the supply power supplied to the span motor may be configured to rotate the central shaft of the rotor of such span motor in a clockwise rotation and, thereby, the span is driven in a forward movement direction by a respective fixed-speed drive assembly until a substantial straight alignment is restored between the adjacent spans (i.e., respective intermediate tower structure not lagging and not leading). The switches signal two distinct states of alignment based on either a forward movement direction or a reverse movement direction and on a closed switch contact or an opened switch contact that results in either a span motor "on" control or a span motor "off" control.

The fixed-speed drive assemblies incorporating the span motors are, therefore, alternately and repeatedly controlled "on" and "off" by way of a discrete "on" signal switch state or "off" signal switch state. The wheels of the intermediate tower structures may each be driven in either a forward movement direction or a reverse movement direction at a uniform speed with closed switch contacts and stopped with opened switch contacts. This process is repeated by each successive intermediate tower structure of the irrigation system until all of the spans are brought into substantial straight alignment. Each time a tower structure is advanced in either a forward movement direction or a reverse movement direction, a new distinct state of alignment is signaled by the corresponding switch and the process is repeated.

In center pivot irrigation systems, the radially-outermost tower structure (or end tower structure) typically leads the movement of the spans of the irrigation system, while in a lateral move irrigation system either one of the end tower structures typically leads the movement of the spans of the irrigation system. In a center pivot irrigation system, the outermost or end span wheel track has the largest circumference; and, therefore, the end span has the farthest distance to travel. In the prior art, the intermediate spans have relatively smaller wheel track circumferences and therefore can always keep up with the pace of the end span while using substantially the same fixed-speed span motors, assuming similar wheel tire sizes and gearing ratios.

This conventional manner of movement and substantial straight alignment of the spans of irrigation systems requires countless starts-and-stops by the intermediate tower structures, and the corresponding fixed-speed drive assemblies that move them. The number of repeated on-and-off control cycles of the corresponding span motor providing the movement for a respective intermediate tower structure can exceed one thousand a day during continuous operation. This repeated on-and-off control cycling of the corresponding span motors, which is repeated every day, all day, that the irrigation system is operating, causes excessive wear on the electrical components, structural components, and mechanical parts of the fixed-speed drive assembly, especially the span motors, knuckles and gearboxes transferring power to the wheels.

To mitigate the stress on the irrigation system caused by the repetitive start-and-stop movement of fixed-speed drive assemblies typically utilizing alignment detectors as discussed above, movement control systems have been proposed to provide a relatively smooth and continuous movement of the intermediate spans and their respective intermediate tower structures. These continuous movement control systems typically employ potentiometers or other analog sensors, such as capacitive displacement sensors, strain gauge sensors, non-contact proximity sensors or other devices capable of quantifiably measuring a precise degree of span alignment. Analog alignment sensor signals vary in magnitude in direct correlation or proportion to the degrees of deviation in alignment of one span with respect to adjacent interconnected spans. Such analog alignment sensor signals are monitored and processed by variable-speed drive controllers configured to vary aspects of the supply power (i.e., vary the speed) furnished to the corresponding span motor. This, in turn, varies the span motor RPM that, in turn, varies the RPM of the wheels in response to changing analog alignment sensor signals. These analog type sensors are in lieu of typical rod and switch actuators and cams or similar discrete signaling devices that merely use a switch to signal if the state of alignment is beyond a preset maximum value, as is the case with the conventional systems of the prior art for center pivot irrigation system movement control systems.

The variations in the magnitude or intensity of analog sensor signals are monitored and processed by variable-speed drive controllers that, in turn, vary aspects of the supply power (i.e., vary the speed) furnished to the corresponding span motors turning the wheels of the intermediate tower structures in substantially direct correlation or proportion to the degrees of deviation in alignment as detected and outputted by the analog sensors, such that detection of greater angles of deviation in alignment of the interconnected spans results in relatively faster span motor speeds, and detection of relatively lower angles of deviation in alignment results in relatively slower span motor speeds. Such means of varying span motor speeds in direct proportion to the degrees of deviation in alignment as detected and outputted by the analog sensors (i.e., the selected speed of the variable-speed drive controller is based upon the alignment) to maintain substantial straight alignment of the spans with continuous movement requires the span motors to constantly transition between faster speeds and slower speeds (i.e., transient state speeds of movement) as opposed to evolving to unchanging fixed-speeds (i.e., steady state speeds of movement).

Krieger (U.S. Pat. No. 6,755,362), Malsam (U.S. Patent App. Pub. No. 2013/0018553) and Grabow (U.S. Patent App. Pub. No. 2013/0253752) have proposed to provide a relatively smooth and continuous movement and substantial straight alignment of spans using potentiometers or other analog sensors or, in the case of Grabow, GPS (global positioning system) data is used as a means of generating analog alignment sensor signals for varying span motor speeds in direct proportion to the degrees of deviation in alignment.

SUMMARY OF THE INVENTION

The present invention discloses an irrigation system that includes multiple interconnected spans that are supported by multiple tower structures. Each intermediate tower structure and end tower structure may include a dual-controller drive assembly that may include both a fixed-speed drive controller controlling the speed of movement of the dual-controller drive assembly when the fixed-speed drive controller is selected and a variable-speed drive controller controlling the speed of movement of the dual-controller drive assembly when the variable-speed drive controller is selected, and one or more selector switches configured to be actuated either manually, based on manual operator input, or automatically, based on automatic sensor input, and to select between the fixed-speed drive controller and the variable-speed drive controller. Both such fixed-speed drive controller and variable-speed drive controller may be conventional and of the prior art described herein.

In a first and preferred embodiment, to enable selective operation of either the fixed-speed drive controller or the variable-speed drive controller of each corresponding dual-controller drive assembly, a selector switch or similar device is proposed to selectively connect the supply power to either the fixed-speed drive controller or the variable-speed drive controller of the corresponding dual-controller drive assembly to control the speed of movement of the corresponding dual-controller drive assembly.

The supply power may be first connected to a selector switch that, in turn, connects such supply power to either the fixed-speed drive controller when the fixed-speed drive controller is selected or the variable-speed drive controller when the variable-speed drive controller is selected, with the selected drive controller connected to the supply power and the non-selected drive controller not connected to the supply power. Both the fixed-speed drive controller and the variable-speed drive controller may simultaneously each be in communication with and wired to a corresponding span motor of a corresponding dual-controller drive assembly, wherein, only one of the two drive controllers is connected to supply power via the selector switch at any one time. Such first and preferred embodiment may require additional electrical components to eliminate potential corresponding span motor feedback to both the fixed-speed drive controller and the variable-speed drive controller.

In a second embodiment, the supply power may be first connected directly to both the fixed-speed drive controller and the variable-speed drive controller simultaneously. The selector switch, in turn, may be connected to both the fixed-speed drive controller and the variable-speed drive controller and to the corresponding span motor, wherein, the fixed-speed drive controller may be connected to the corresponding span motor when the fixed-speed drive controller is selected and the variable-speed drive controller may be connected to the corresponding span motor when the variable-speed drive controller is selected, with the selected drive controller connected to the corresponding span motor and the non-selected drive controller not connected to the corresponding span motor. Both the fixed-speed drive controller and the variable-speed drive controller may simultaneously each be in communication with and wired to the supply power, wherein, only one of the two drive controllers is connected to the corresponding span motor via the selector switch at any one time.

In a third embodiment, two selector switches may be utilized in combination such that a first selector switch may be first connected to the supply power while a second selector switch may be first connected to the corresponding span motor, wherein, the first selector switch connects supply power to either the fixed-speed drive controller or the variable-speed drive controller and the second selector switch connects either the fixed-speed drive controller or the variable-speed drive controller to the corresponding span motor. Such third embodiment may be used to isolate incoming supply power and eliminate potential corresponding span motor feedback to one of either the fixed-speed drive controller or the variable-speed drive controller.

In the first and preferred embodiment, the fixed-speed drive controller may be configured to control of the speed of movement of the corresponding dual-controller drive assembly in either a forward movement direction or a reverse movement direction by repeated on-and-off control cycling the corresponding span motor, described herein as prior art. Similarly, the variable-speed drive controller may be configured to control the speed of movement of the corresponding dual-controller drive assembly in either a forward movement direction or a reverse movement direction by varying aspects of the supply power (i.e., vary the speed) furnished to the corresponding span motor, also described herein as prior art.

The selection of either the fixed-speed drive controller or the variable-speed drive controller of a corresponding dual-controller drive assembly may be performed using one or more selector switches actuated manually based on manual operator input or, likewise, actuated automatically based on automatic sensor input (i.e., in response to sensor data such as water pressure, ambient temperature, movement direction, wind velocity, internal or external variable-speed drive controller temperature, system operation, system fault, etc.). The selection of either the fixed-speed drive controller or the variable-speed drive controller of a corresponding dual-controller drive assembly may also be implemented remotely using conventional wired remote control systems or wireless remote control systems known in the art.

The selector switches may be located in relatively close proximity to the corresponding fixed-speed drive controllers and the variable-speed drive controllers of the dual-controller drive assemblies. Alternatively, such selector switches may be remotely located at the center pivot point structure or other remote locations. One or more selector switches may also be configured to select between the fixed-speed drive controllers and the variable-speed drive controllers of a plurality of corresponding dual-controller drive assemblies.

The dual-controller drive assembly of the present invention provides a simple and convenient means of using one or more selector switches to select between a fixed-speed drive controller and a variable-speed drive controller. Such dual-controller drive assemblies provide redundancy for the variable-speed drive controllers that, in turn, helps facilitate early adoption of the newer variable-speed technology. Manufacturers may also offer an option with new irrigation systems that are not initially equipped with variable-speed drive controllers but are ready for variable-speed drive controllers to be easily installed into the dual-controller drive assemblies at a later time. Irrigation systems utilizing variable-speed drive controllers to control the speed of movement have the potential to vastly improve both irrigation system performance and reliability as compared to irrigation systems that only utilize the more conventional fixed-speed drive controllers to control the speed of movement.

BRIEF DESCRIPTION OF THE DRAWINGS

The detailed description is described with reference to the accompanying figures.

DETAILED DESCRIPTION OF THE INVENTION

Figure 1A:
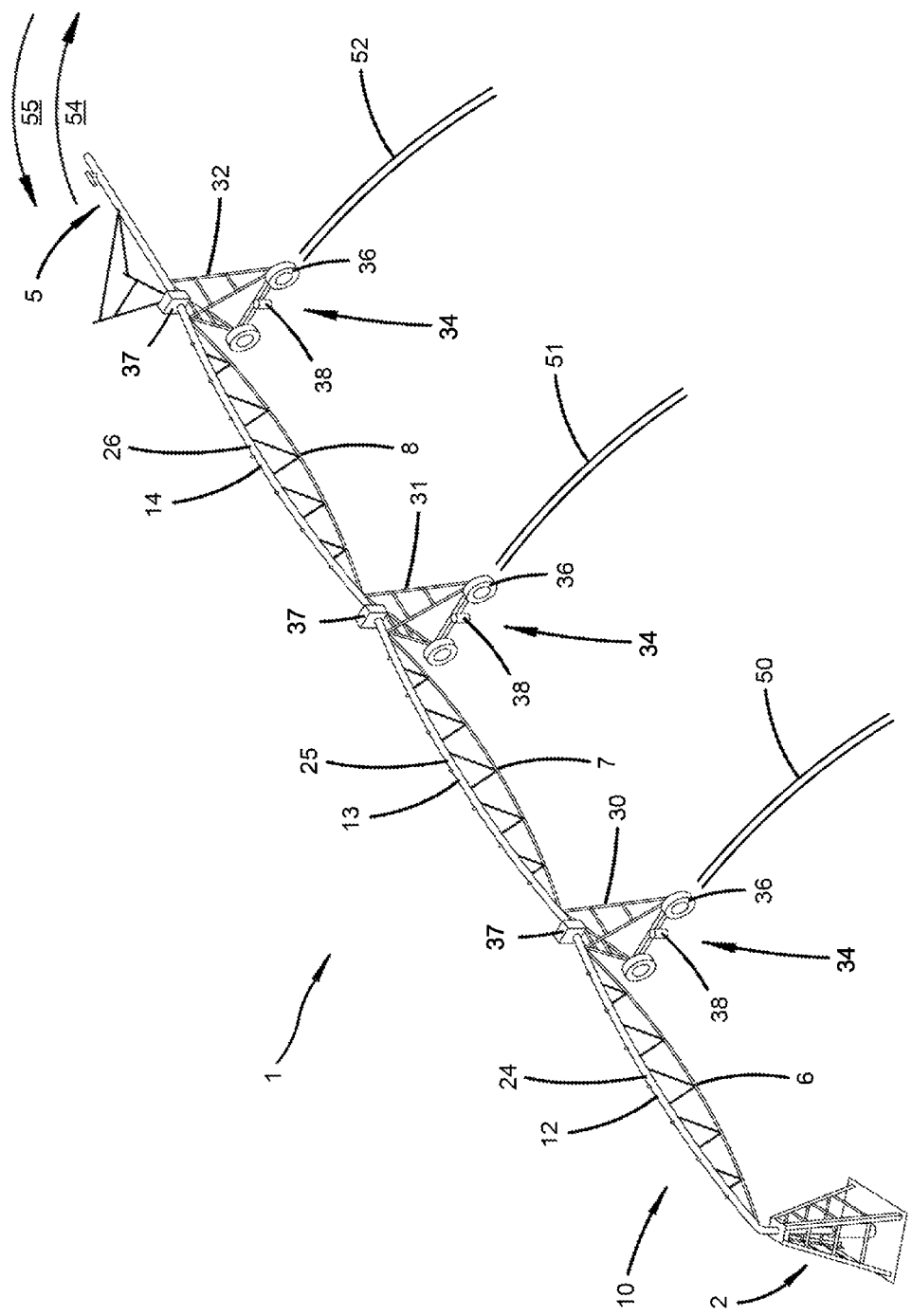
FIG. 1A is an isometric diagrammatic perspective view of an irrigation system with fixed-speed drive assemblies in accordance with an example implementation of the prior art.

Overview.

Irrigation systems, such as center pivot irrigation systems, generally include fixed-speed drive assemblies at each of the intermediate tower structures to propel the irrigation systems over a respective ground surface, cultivation area or field. Such irrigation systems rely on span motors with fixed-rate speeds of the central shafts of the rotors of such span motors due to their relative simplicity and robustness. Such systems, however, can only control the speed of movement of the corresponding fixed-speed drive assemblies by repeated on-and-off control cycling of the corresponding span motors. This results in each tower structure coming to a complete stop and then requiring a large impulse of power to the corresponding span motor to start the intermediate tower structure moving again. These strenuous and repetitive start-and-stop movements that result from repeated on-and-off control cycling of the corresponding span motors can result in excessive stress on structures, wear on components, and downtime of the irrigation system. The irregular motion caused by these strenuous and repetitive start-and-stop movements can also cause uneven application of irrigation water and/or chemicals to the field. This results in waste of both water and chemicals.

Accordingly, irrigation systems, such as center pivot irrigation systems, have been proposed that include variable-speed drive assemblies at each of the tower structures to propel the irrigation systems over a respective ground surface, cultivation area or field. Such irrigation systems can control the speed of movement of the corresponding variable-speed drive assemblies with smooth and continuous movements of each tower structure. These smooth and continuous movements result in reduced stress on structures, reduced wear on components, and reduced downtime of the irrigation system. These smooth and continuous movements can also result in uniform and precise application of irrigation water and/or chemicals to the field. This results in less waste of both water and chemicals.

The present invention discloses irrigation systems, such as center pivot irrigation systems, that may include a dual-controller drive assembly that may include both a fixed-speed drive controller controlling the speed of movement of the dual-controller drive assembly when the fixed-speed drive controller is selected and a variable-speed drive controller controlling the speed of movement of the dual-controller drive assembly when the variable-speed drive controller is selected, and one or more selector switches configured to be actuated either manually, based on manual operator input, or automatically, based on automatic sensor input, and to select between the fixed-speed drive controller and the variable-speed drive controller. Both such fixed-speed drive controller and variable-speed drive controller may be conventional and of the prior art described herein. The dual-controller drive assembly provides a simple and convenient means of using one or more selector switches to select between a fixed-speed drive controller and a variable-speed drive controller. Such dual-controller drive assemblies provide redundancy for the variable-speed drive controllers that, in turn, helps facilitate early adoption of the newer variable-speed technology. Manufacturers may also offer an option with new irrigation systems that are not initially equipped with variable-speed drive controllers but are ready for variable-speed drive controllers to be easily installed into the dual-controller drive assemblies at a later time.

Prior Art.

Figure 1B:
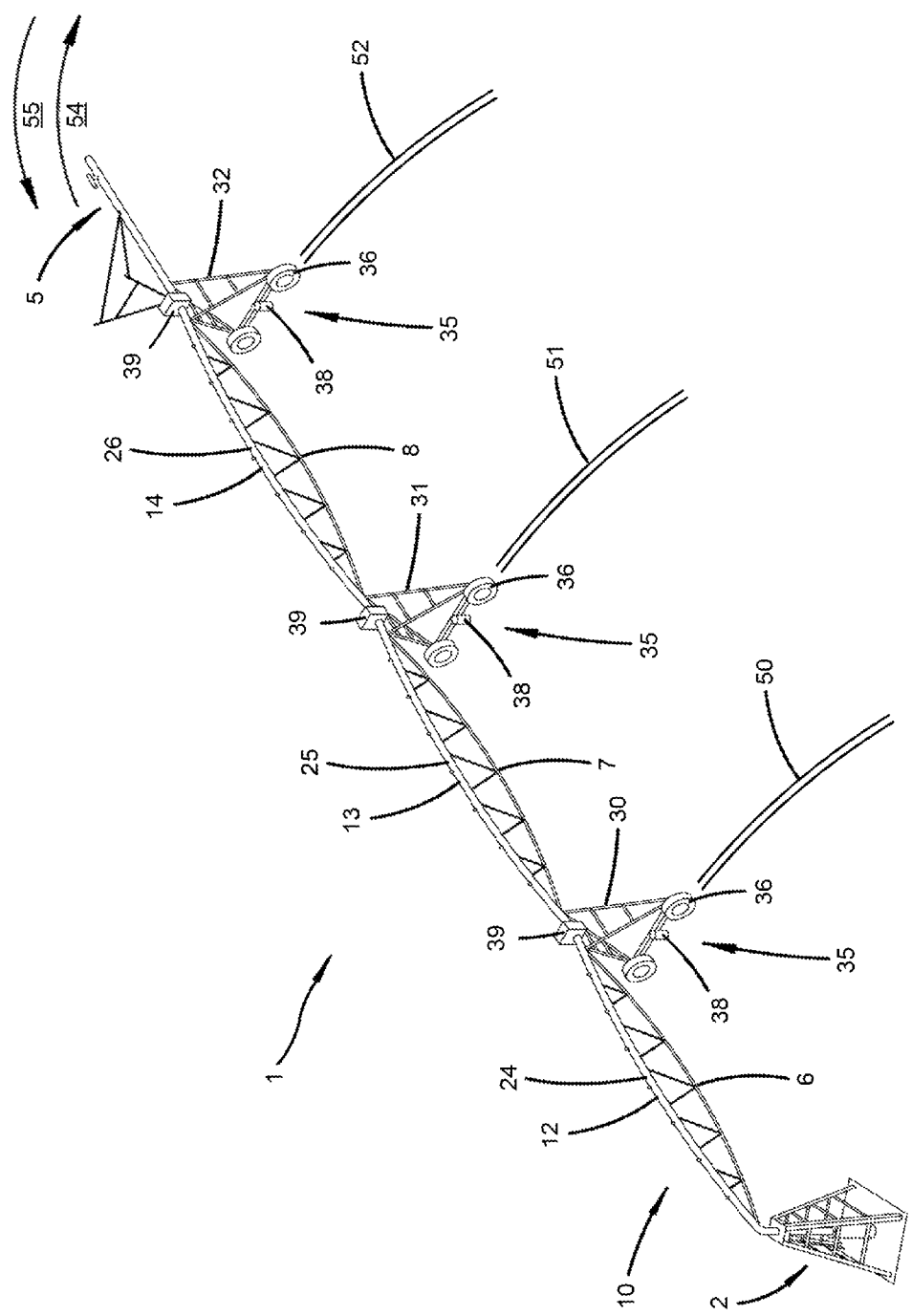
FIG. 1B is an isometric diagrammatic perspective view of an irrigation system with variable-speed drive assemblies in accordance with an example implementation of the prior art.

FIGS. 1A and 1B illustrate a self-propelled (e.g., mechanized) irrigation system 1 in accordance with embodiments of the prior art. Examples of self-propelled irrigation systems include a center pivot irrigation system 1, a linear move irrigation system (not shown), or the like. FIGS. 1A and 1B illustrate embodiments of the prior art wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

Figure 2A:
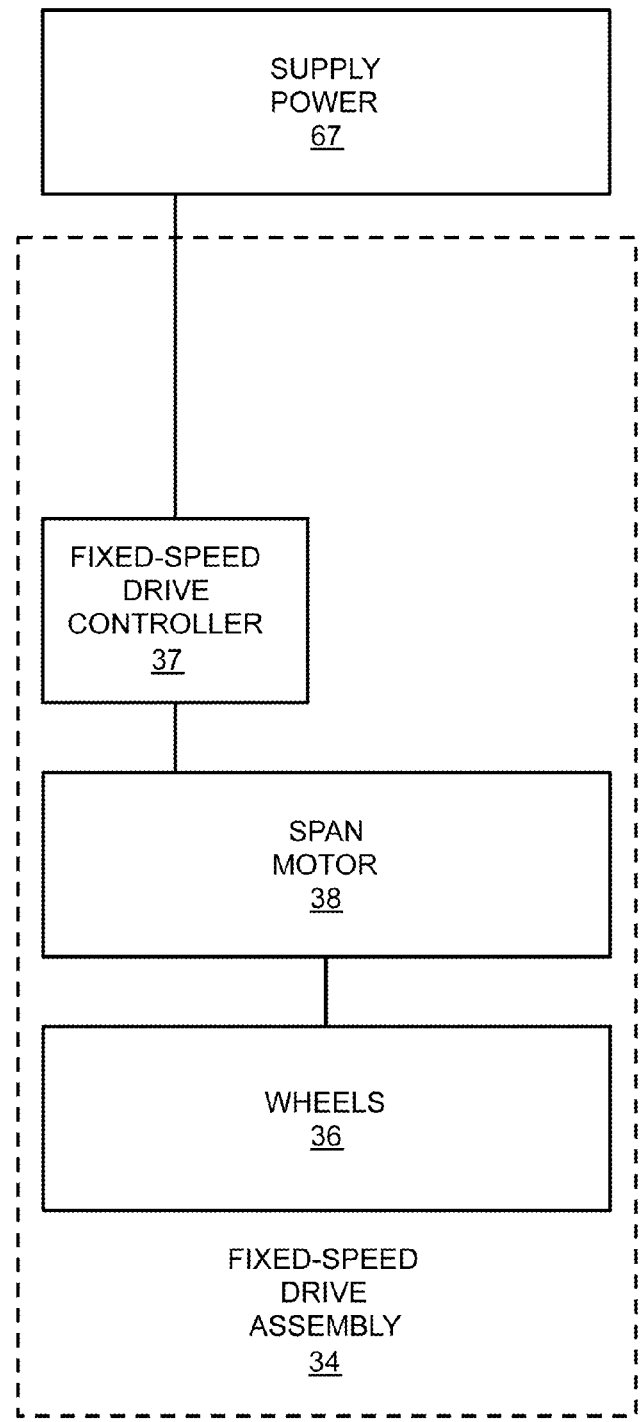
FIG. 2A is a block diagram illustrating the selected elements of the fixed-speed drive assembly of the irrigation system shown in FIG. 1A in accordance with an example implementation of the prior art.
Figure 3A:
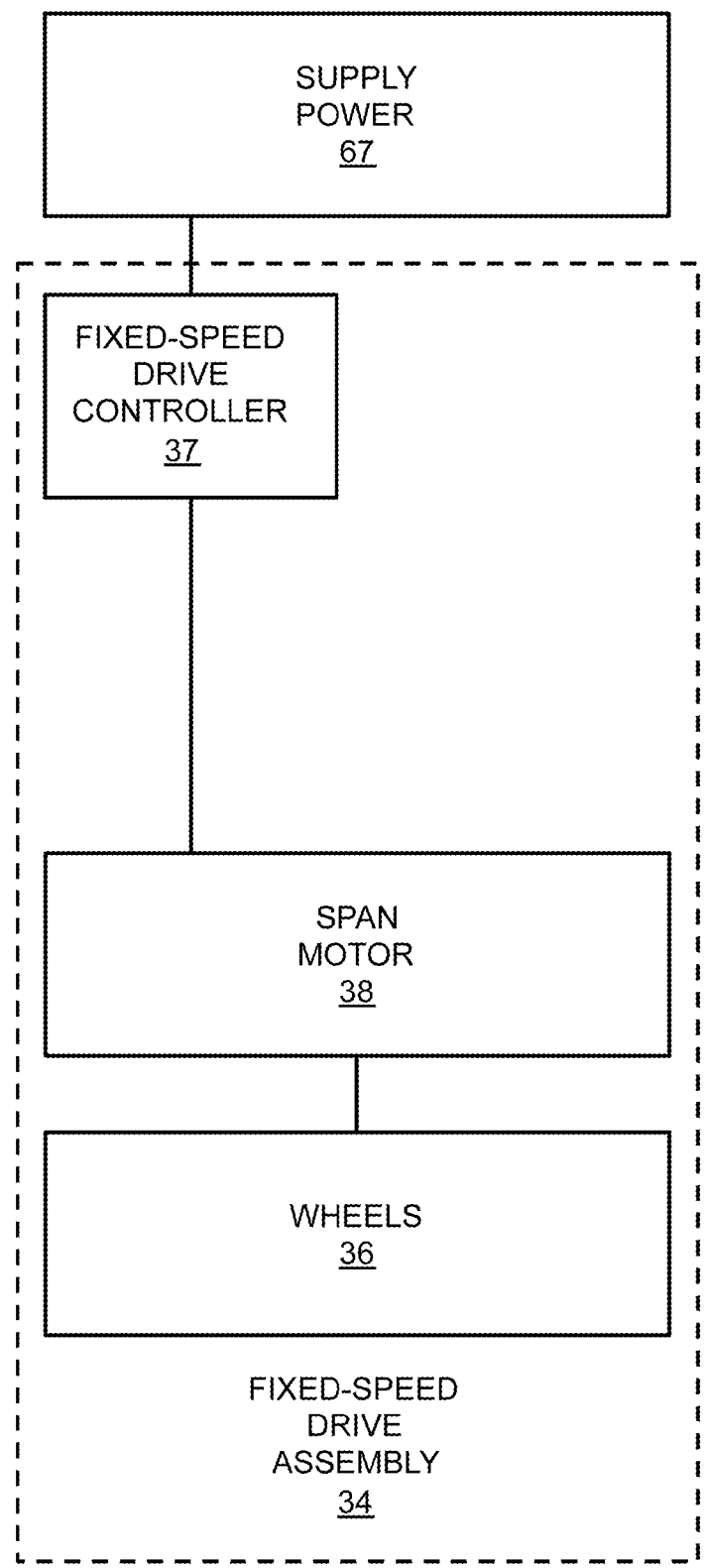
FIG. 3A is a block diagram illustrating the selected elements of the fixed-speed drive assembly of the irrigation system shown in FIG. 1A in accordance with an example implementation of the prior art.

FIGS. 2A and 3A illustrates a fixed-speed drive assembly 34 typical of conventional irrigation systems 1. Each fixed-speed drive assembly 34 may include a span motor 38, wheels 36, and a fixed-speed drive controller 37. The fixed-speed drive controller 37 typically used in the prior art is an electromechanical contactor or motor starter that controls the repeated on-and-off control cycling of each corresponding span motor 38, such repeated on-and-off control cycling of each corresponding span motor 38 being necessary to control the speed of movement in either a forward movement direction 54 or a reverse movement direction 55 while the irrigation system 1 is operating.

Figure 2B:
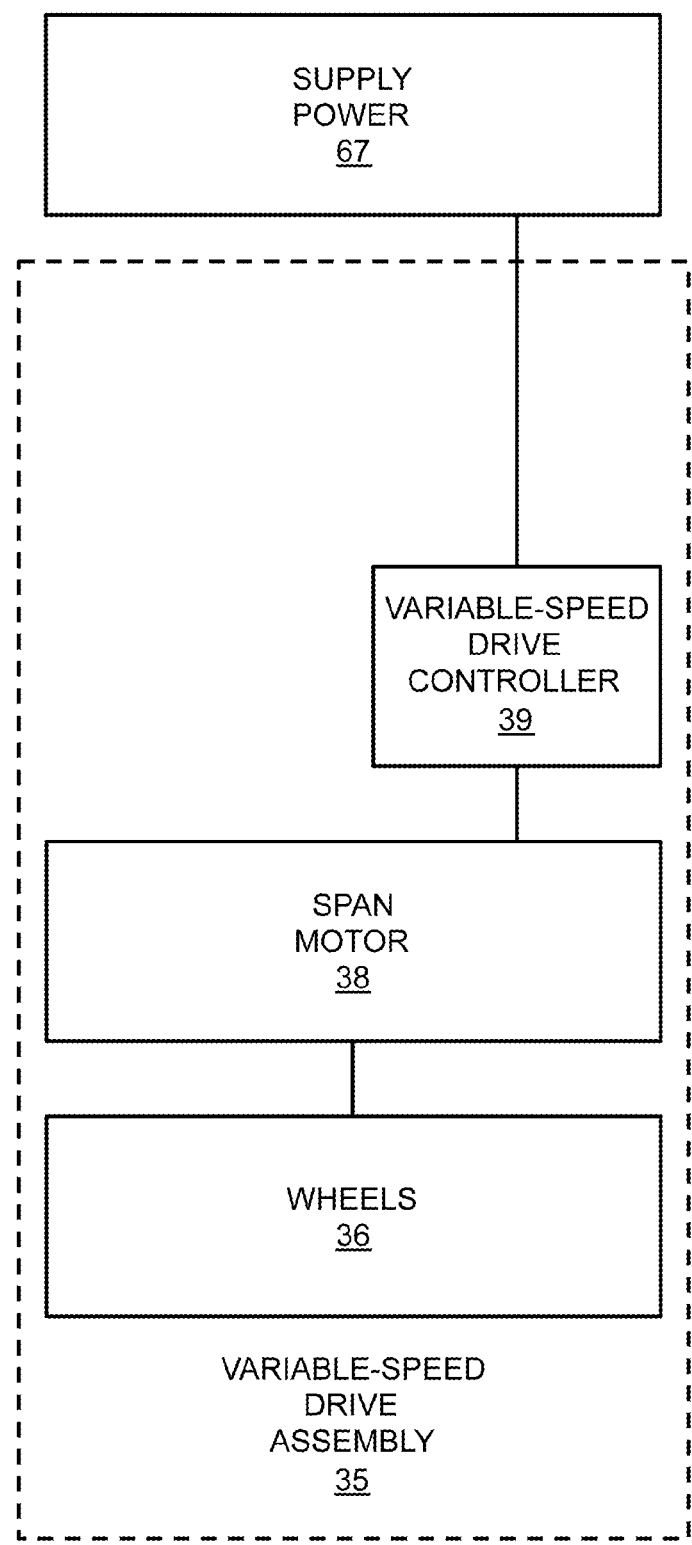
FIG. 2B is a block diagram illustrating the selected elements of the variable-speed drive assembly of the irrigation system shown in FIG. 1B in accordance with an example implementation of the prior art.
Figure 3B:
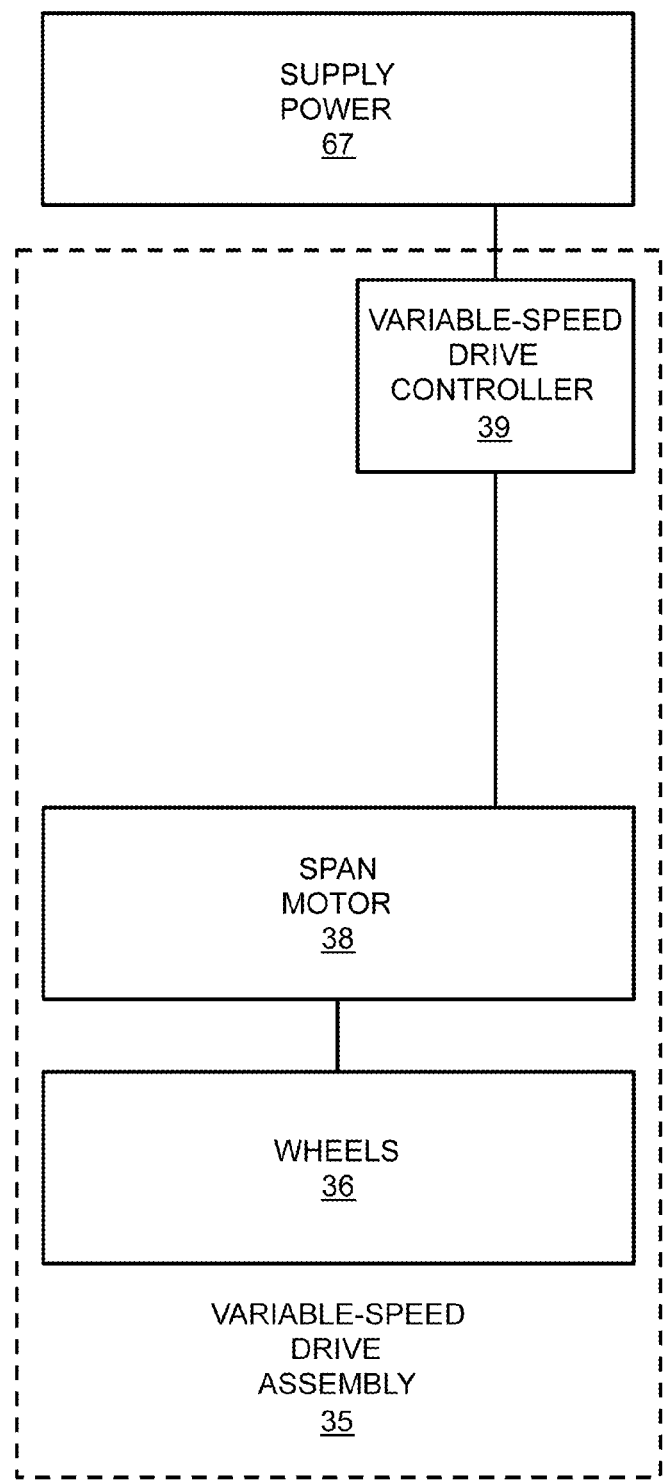
FIG. 3B is a block diagram illustrating the selected elements of the variable-speed drive assembly of the irrigation system shown in FIG. 1B in accordance with an example implementation of the prior art.

FIGS. 2B and 3B illustrates a variable-speed drive assembly 35 typical of conventional irrigation systems 1. Each variable-speed drive assembly 35 may include a span motor 38, wheels 36, and a variable-speed drive controller 37. The variable-speed drive controller 37 typically used in the prior art is a VFD (variable frequency drive) or similar device that controls the selected speed of each corresponding span motor 38, such selected speeds of each corresponding span motor 38 being necessary to control the speed of movement in either a forward movement direction 54 or a reverse movement direction 55 while the irrigation system 1 is operating.

Example Implementations of the Present Invention.

Figure 1C:
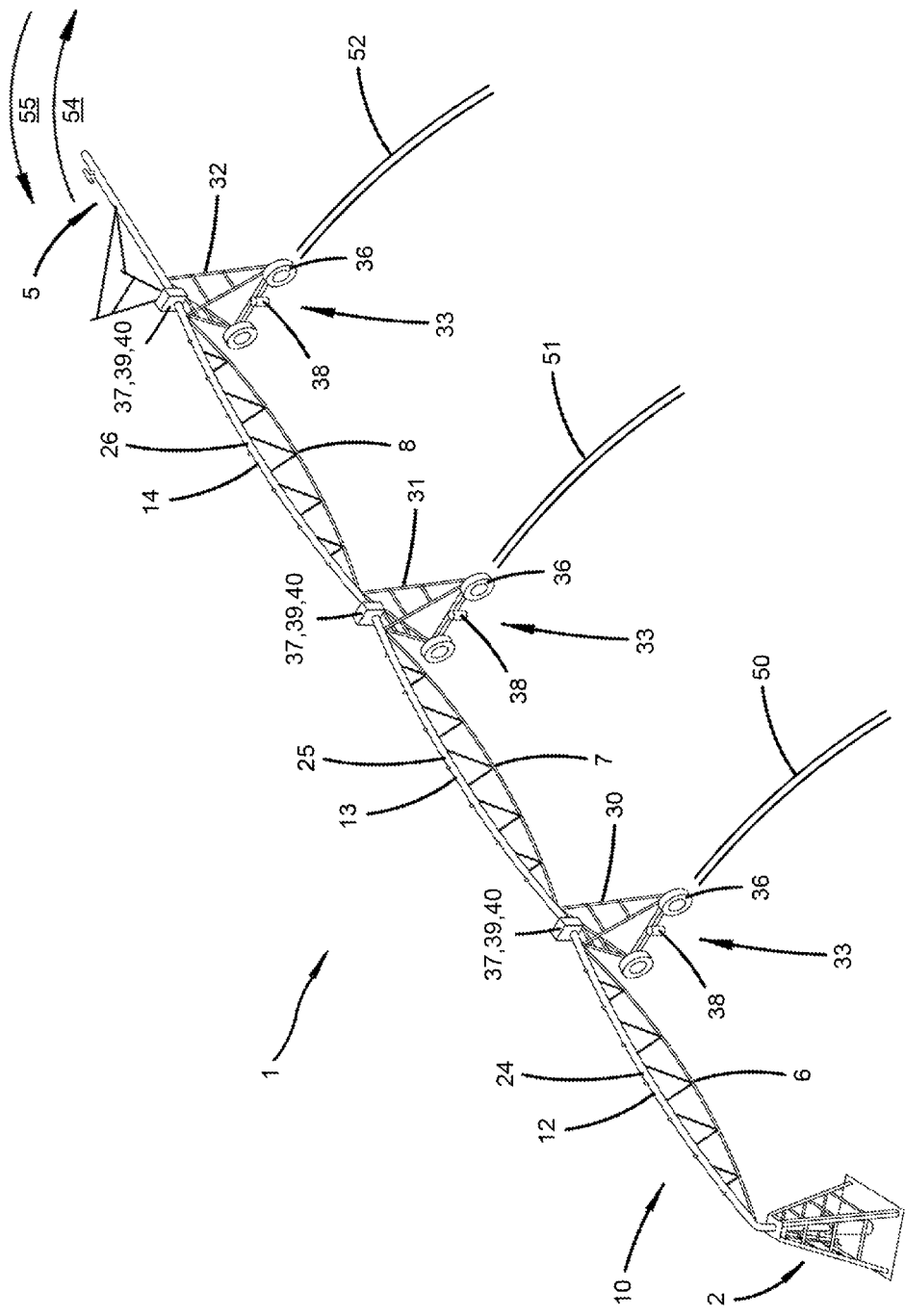
FIG. 1C is an isometric diagrammatic perspective view of an irrigation system with dual-controller drive assemblies in accordance with an example implementation of the present invention.

FIG. 1C illustrates a self-propelled (e.g., mechanized) irrigation system 1 in accordance with embodiments of the present invention. Examples of self-propelled irrigation systems include a center pivot irrigation system 1, a linear move irrigation system (not shown), or the like. FIG. 1C illustrates embodiments of the present invention wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

The main section assembly 10 includes a number of interconnected intermediate spans 12, 13 with applicant conduits 24, 25 that are each supported by a truss-type framework structure 6, 7 and by one or more intermediate tower structures 30, 31 and an interconnected end span 14 with applicant conduit 26 that is supported by a truss-type framework structure 8 and by an end tower structure 32. The intermediate tower structures 30, 31 and end tower structure 32 are configured to travel about the center pivot point structure 2 in a circular path that creates wheel tracks 50, 51, 52. The intermediate tower structures 30, 31 and end tower structure 32 may be any tower configuration known in the art to adequately support the applicant conduits 24, 25, 26, (e.g., pipes) described herein. It is to be understood that the main section assembly 10 may include any number of spans 24, 25, 26 and intermediate tower structures 30, 31 and end tower structure 32. The direction of travel for the main section assembly 10 can be either a forward movement direction 54 or a reverse movement direction 55.

The intermediate tower structures 30, 31 and the end tower structure 32 each may include one or more wheels 36, to assist in traversing the irrigation system 1 so as to pivot the main section assembly 10 about a ground surface, cultivation area or field in a forward movement direction 54 or a reverse movement direction 55 along wheel tracks 50, 51, 52. As shown in FIGS. 1A, 1B and 1C each intermediate span 12, 13 and end span 14 may include applicant conduits 24, 25, 26 (e.g., pipes) that are configured to carry liquid (e.g., applicant) along the length of the irrigation system 1 to one or more applicant dispersal assemblies that are configured to irrigate the cultivation area. Each conduit 24, 25, 26 may be coupled to one another to allow fluid communication between each conduit. In an implementation, the applicant conduits 24, 25, 26 may be supported by truss-type framework structures 6, 7, 8. Thus, the main fluid displacement device may be configured to displace applicant through the applicant conduits 24, 25, 26. As shown in FIGS. 1A, 1B and 1C, the irrigation system 1 also may include a cantilevered boom structure 5 that extends outwardly from the end tower structure 32.

With reference to FIGS. 2A and 3A, it should be noted that typically the same electromechanical contactor device, typically located at a central control panel (not shown) and controlled by an operator, configures supply power 67 to set the rotation of the central shafts of the rotors of span motors 38 to result in either a forward movement direction 54 or a reverse movement direction 55.

With reference to FIGS. 2B and 3B, each variable-speed drive assembly 35 may include a span motor 38, wheels 36, and a variable-speed drive controller 39 that varies aspects of the supply power 67 (i.e., varies the speed) furnished to the corresponding span motor 38.

In an example implementation of the present invention, one or more intermediate tower structures 30, 31 and end tower structure 32 may be controlled by a suitable dual-controller drive assembly 33 to assist in traversing the irrigation system 1 over a respective ground surface, cultivation area or field. For example, each intermediate tower structure 30, 31 and end tower structure 32 may include a dual-controller drive assembly 33 to propel the respective intermediate tower structure 30, 31 and end tower structure 32 over a respective ground surface, cultivation area or field in either a forward movement direction 54 or a reverse movement direction 55.

As described above, the dual-controller drive assembly 33 may incorporate one or more span motors 38 configured to drive the irrigation system 1 in a forward movement direction 54 or a reverse movement direction 55 based on the configuration of supply power 67.

Figure 2C:
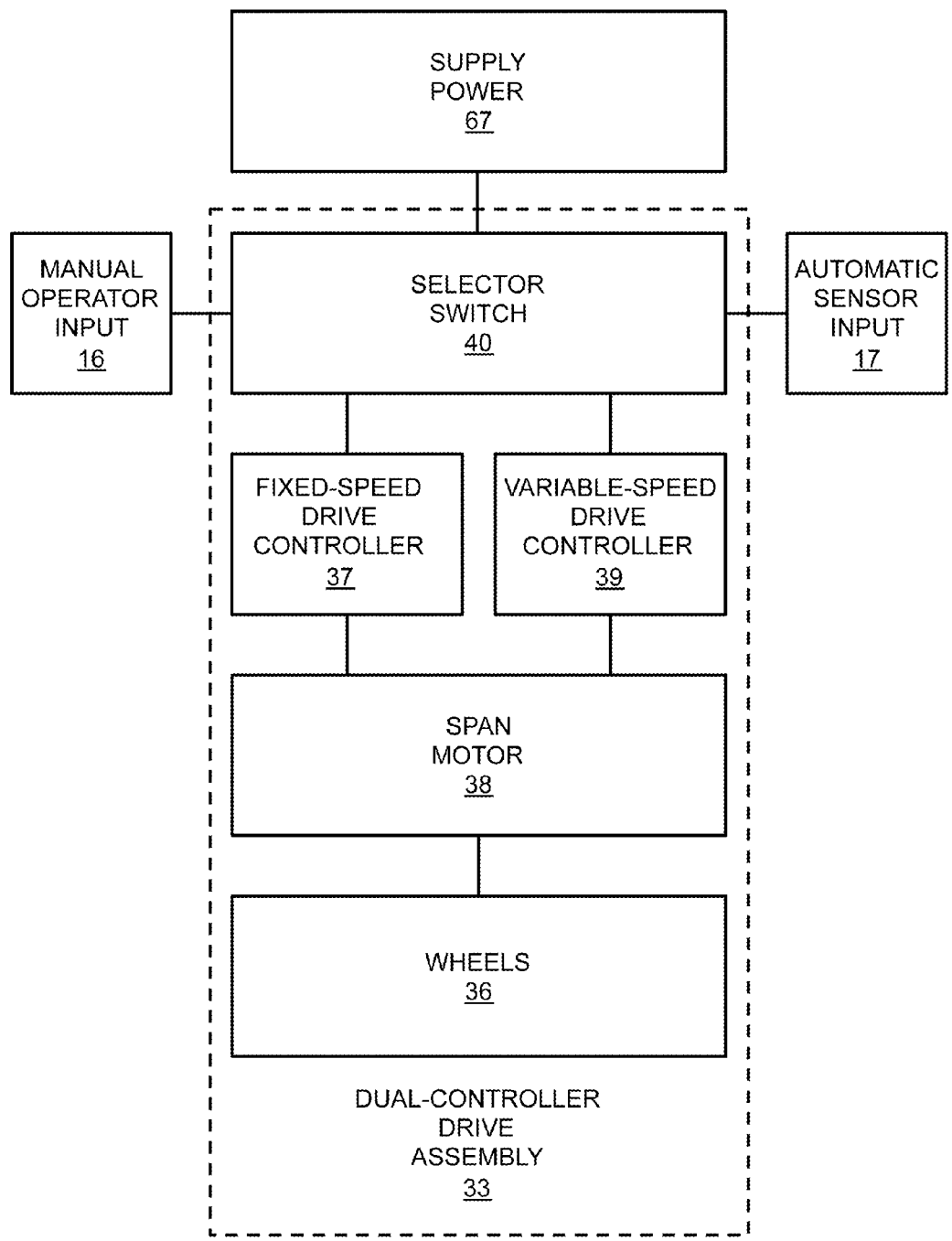
FIG. 2C is a block diagram illustrating the selected elements of the dual-controller drive assembly in the first of three configurations of the present invention of the irrigation system shown in FIG. 1C in accordance with an example implementation of the present invention.
Figure 3C:
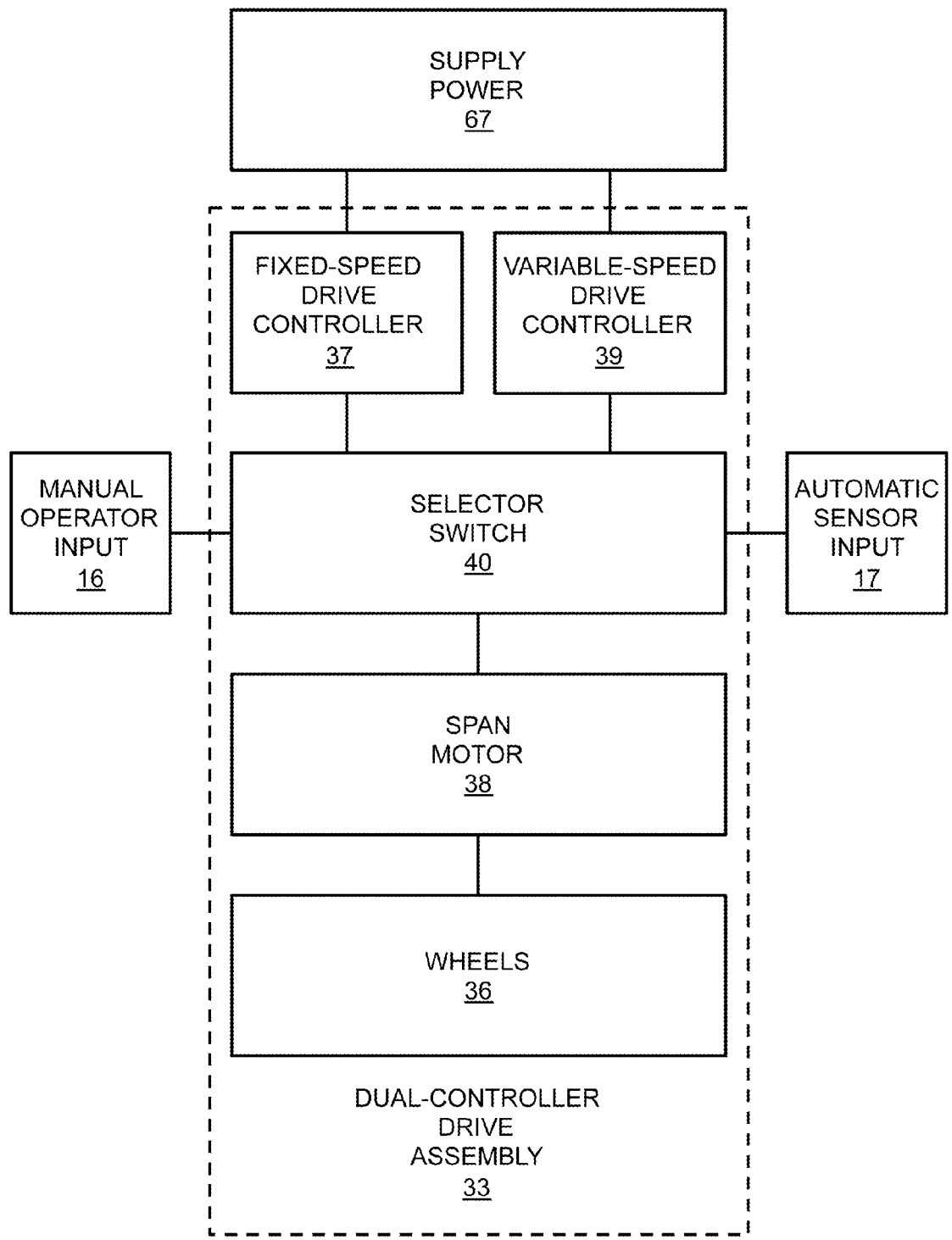
FIG. 3C is a block diagram illustrating the selected elements of the dual-controller drive assembly in the second of three configurations of the present invention of the irrigation system shown in FIG. 1C in accordance with an example implementation of the present invention.
Figure 4A:
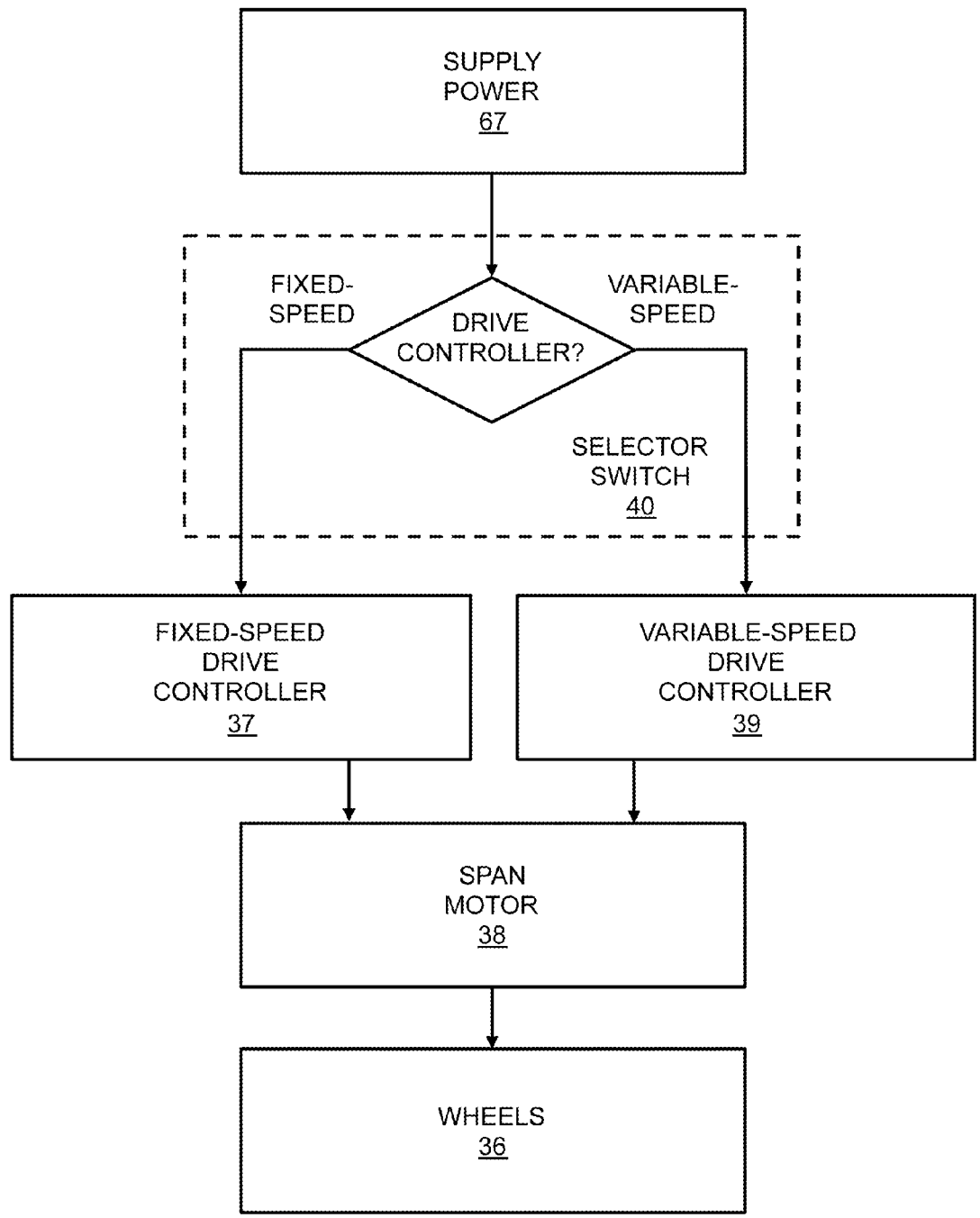
FIG. 4A is a block diagram illustrating the first of three configurations of the present invention of the irrigation system shown in FIG. 1C in accordance with an example implementation of the present invention.
Figure 4B:
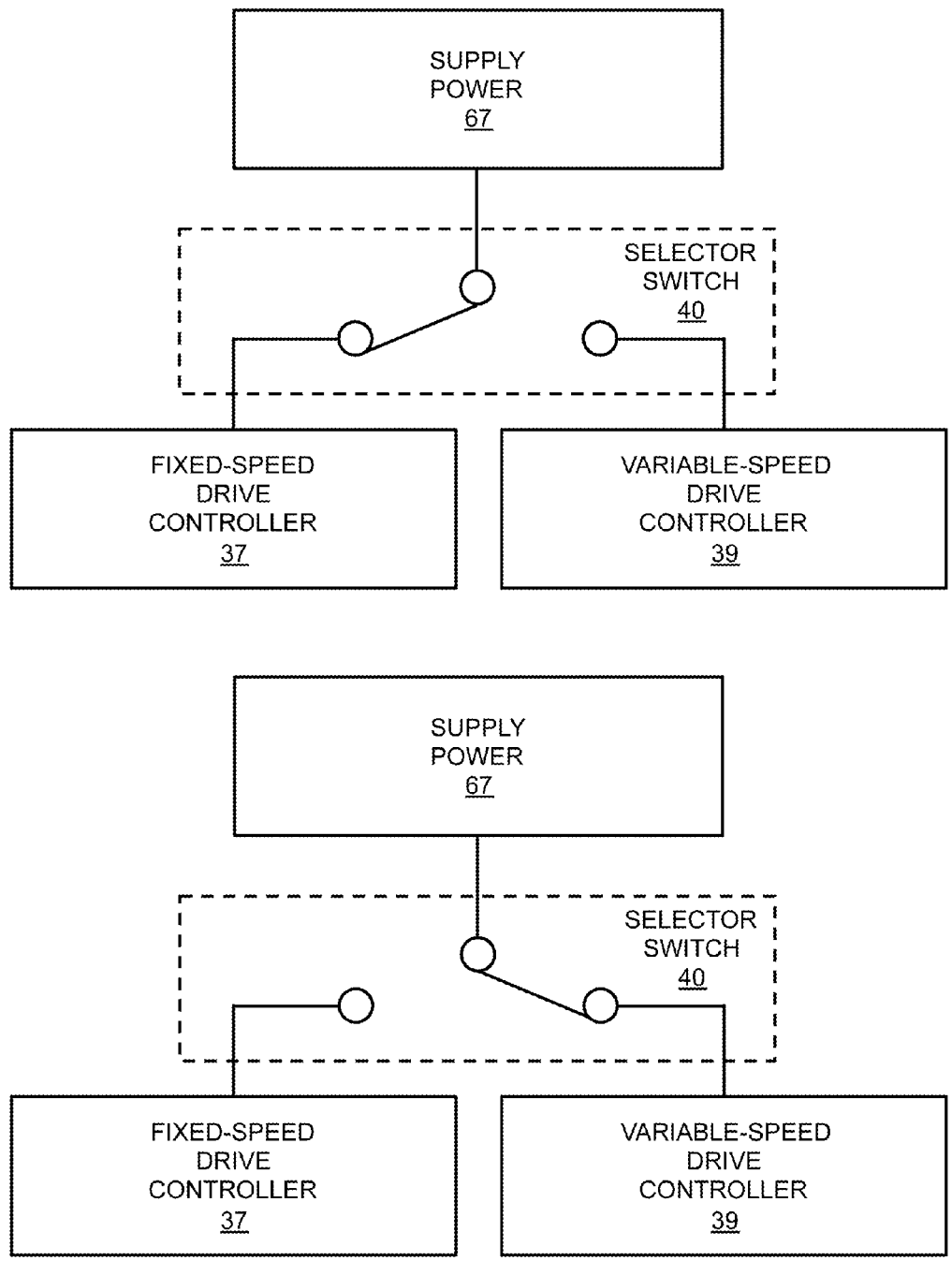
FIG. 4B is a schematic diagram illustrating the selected elements of the selector switch shown in FIGS. 2C and 4A in accordance with an example implementation of the present invention.
Figure 5A:
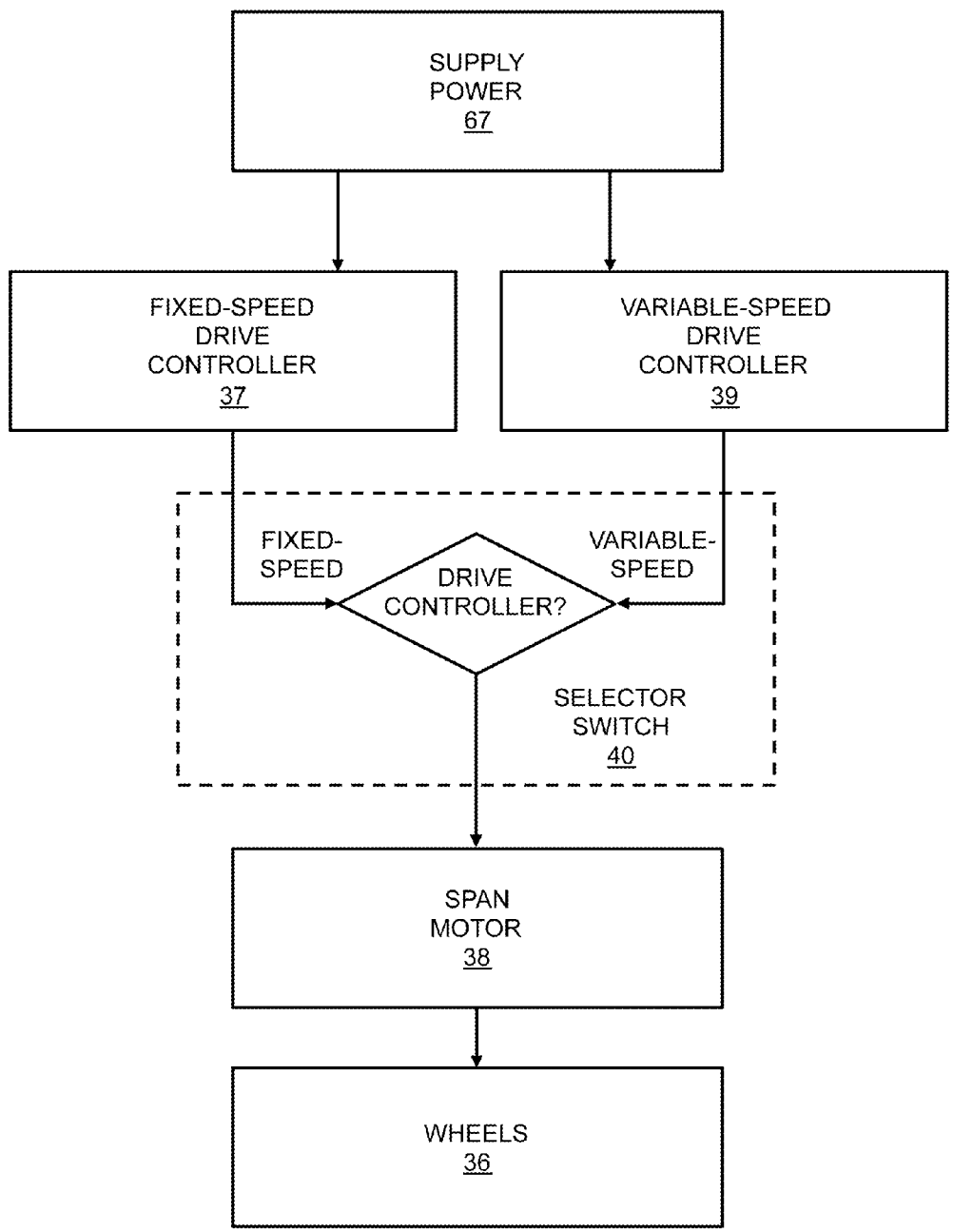
FIG. 5A is a block diagram illustrating the second of three configurations of the present invention of the irrigation system shown in FIG. 1C in accordance with an example implementation of the present invention.
Figure 5B:
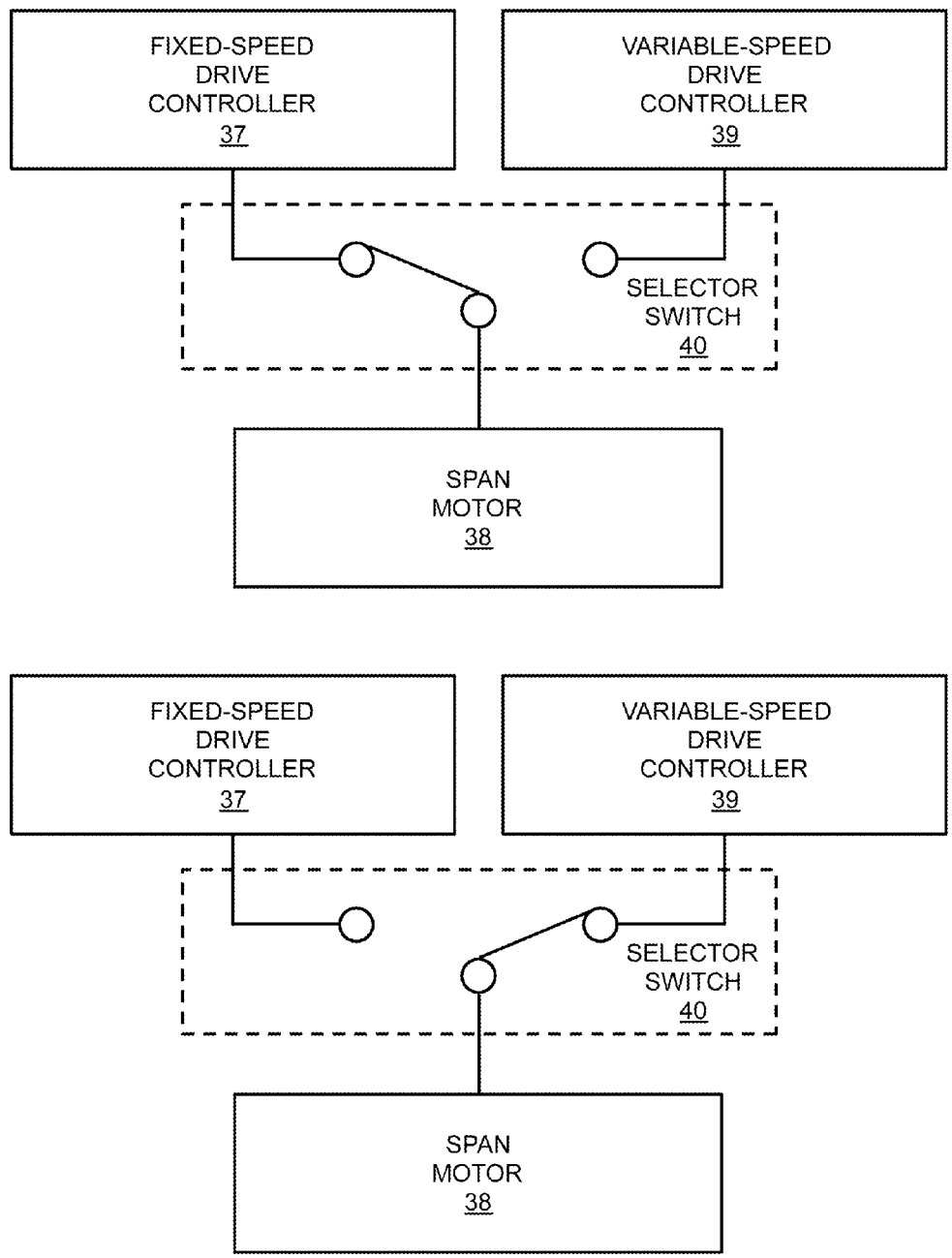
FIG. 5B is a schematic diagram illustrating the selected elements of the selector switch shown in FIGS. 3C and 5A in accordance with an example implementation of the present invention.

As shown in FIGS. 2C, 3C, 4A, 4B, 5A and 5B, both the fixed-speed drive controller 37 and variable-speed drive controller 39 may be directly connected with the respective selector switch 40 (e.g., via a wired connection). A non-limiting list of suitable selector switch 40 types includes a cam switch, a drum switch, a solenoid switch, an electromechanical contactor switch, an actuator switch, a toggle switch, a dolly switch, a rocker switch, a push-button switch, a biased switch, a rotary switch, and the like. In another implementation and as shown in FIGS. 3C, 5A and 5B, the selector switch 40 may also be directly connected to the respective span motor 38 (e.g., via a wired connection).

Figure 6:
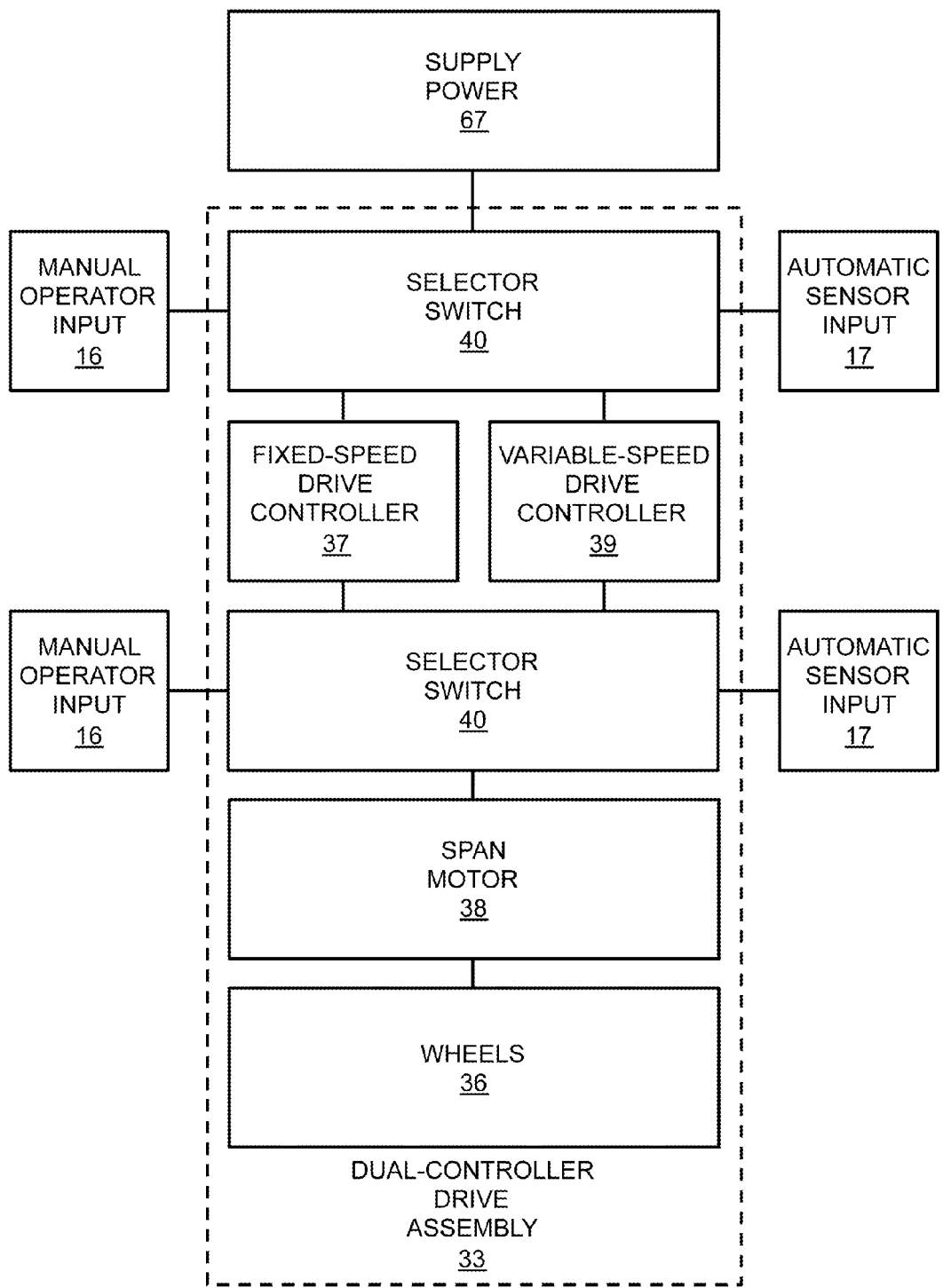
FIG. 6 is a block diagram illustrating the selected elements of the dual-controller drive assembly in the third of three configurations of the present invention of the irrigation system shown in FIG. 1C in accordance with an example implementation of the present invention.

As shown in FIGS. 2C, 3C and 6, each dual-controller drive assembly 33 may include both a fixed-speed drive controller 37 and a variable-speed drive controller 39. A non-limiting list of suitable variable-speed drive controller 39 types includes an AC (alternating current) VFD (variable frequency drive), a variable-torque V/Hz (volts-per-hertz) control VFD, a flux control VFD, a DTC (direct torque control) VFD, a sensorless vector control VFD, a sensored vector control VFD, a brush type DC (direct current) variable-drive control unit, or a DC variable-drive control unit, and the like, all with or without an internal or an external microcontroller or an internal or an external PLC (programmable logic controller).

In a first and preferred embodiment and as shown in FIGS. 2C, 4A and 4B, to enable selective operation of either the fixed-speed drive controller 37 or the variable-speed drive controller 39 of each corresponding dual-controller drive assembly 33, a selector switch 40 or similar device is proposed to selectively connect the supply power 67 to either the fixed-speed drive controller 37 or the variable-speed drive controller 39 of the corresponding dual-controller drive assembly 33 to control the speed of movement of the corresponding dual-controller drive assembly 33.

The supply power 67 may be first connected to a selector switch 40 that, in turn, connects such supply power 67 to either the fixed-speed drive controller 37 when the fixed-speed drive controller 37 is selected (as shown in upper illustration of FIG. 4B) or the variable-speed drive controller 39 when the variable-speed drive controller 39 is selected (as shown in lower illustration of FIG. 4B), with the selected drive controller 37, 39 connected to the supply power 67 and the non-selected drive controller 37, 39 not connected to the supply power 67 (as shown in FIG. 4B). Both the fixed-speed drive controller 37 and the variable-speed drive controller 39 may simultaneously each be in communication with and wired to a corresponding span motor 38 of a corresponding dual-controller drive assembly 33, wherein, only one of the two drive controllers 37, 39 is connected to supply power 67 via the selector switch 40 at any one time (as shown in FIGS. 2C and 4A). Such first and preferred embodiment may require additional electrical components (not shown) to eliminate potential corresponding span motor 38 feedback to both the fixed-speed drive controller 37 and the variable-speed drive controller 39.

In a second embodiment and as shown in FIGS. 3C, 5A and 5B, the supply power 67 may be first connected directly to both the fixed-speed drive controller 37 and the variable-speed drive controller 39, simultaneously. The selector switch 40, in turn, may be connected to both the fixed-speed drive controller 37 and the variable-speed drive controller 39 and to the corresponding span motor 38, wherein, the fixed-speed drive controller 37 may be connected to the corresponding span motor 38 when the fixed-speed drive controller 37 is selected (as shown in upper illustration of FIG. 5B) and the variable-speed drive controller 39 may be connected to the corresponding span motor 38 when the variable-speed drive controller 39 is selected (as shown in lower illustration of FIG. 5B), with the selected drive controller 37, 39 connected to the corresponding span motor 38 and the non-selected drive controller 37, 39 not connected to the corresponding span motor 38 (as shown in FIG. 5B). Both the fixed-speed drive controller 37 and the variable-speed drive controller 39 may simultaneously each be in communication with and wired to the supply power 67, wherein, only one of the two drive controllers 37, 39 is connected to the corresponding span motor via the selector switch 40 at any one time (as shown in FIGS. 3C and 5A).

In a third embodiment and as shown in FIG. 6, two selector switches 40 (or one large selector switch 40, not shown, configured to perform the functions of the two selector switches 40 shown in FIG. 6) may be utilized in combination such that a first selector switch 40 may be first connected to the supply power 67 while a second selector switch 40 may be first connected to the corresponding span motor 38, wherein, the first selector switch 40 connects supply power 67 to either the fixed-speed drive controller 37 or the variable-speed drive controller 39 and the second selector switch 40 connects either the fixed-speed drive controller 37 or the variable-speed drive controller 39 to the corresponding span motor 38. Such third embodiment may be used to isolate incoming supply power 67 and eliminate potential corresponding span motor 38 feedback to one of either the fixed-speed drive controller 37 or the variable-speed drive controller 39.

As shown in FIGS. 2C, 3C, 4A, 4B, 5A and 5B, the fixed-speed drive controller 37 may be configured to control of the speed of movement of the corresponding dual-controller drive assembly 33 in either a forward movement direction 54 or a reverse movement direction 55 by repeated on-and-off control cycling the corresponding span motor 38, described herein as prior art. Similarly, the variable-speed drive controller 39 may be configured to control the speed of movement of the corresponding dual-controller drive assembly 33 in either a forward movement direction 54 or a reverse movement direction 55 by varying aspects of the supply power 67 (i.e., vary the speed) furnished to the corresponding span motor 38, also described herein as prior art.

As shown in FIGS. 2C, 3C and 6, the selection of either the fixed-speed drive controller 37 or the variable-speed drive controller 39 of a corresponding dual-controller drive assembly 33 may be performed using one or more selector switches 40 actuated manually based on manual operator input 16 or, likewise, actuated automatically based on automatic sensor input 17 (i.e., in response to sensor data such as water pressure, ambient temperature, movement direction, wind velocity, internal or external variable-speed drive controller temperature, system operation, system fault, etc.). The selection of either the fixed-speed drive controller 37 or the variable-speed drive controller 39 of a corresponding dual-controller drive assembly 33 may also be implemented remotely using conventional wired remote control systems or wireless remote control systems known in the art.

In the first and preferred embodiment, the selector switch 40 may be located in relatively close proximity to the corresponding fixed-speed drive controller 37 and the variable-speed drive controller 39 of the dual-controller drive assembly 33. Alternatively, such selector switch 40 may be remotely located at the center pivot point structure 2 or other remote locations. One or more selector switches 40 may be configured to select between the fixed-speed drive controllers 37 and the variable-speed drive controllers 39 of a plurality of corresponding dual-controller drive assemblies 33.

As shown in FIGS. 2C, 3C, 4A, 4B, 5A and 5B, the dual-controller drive assembly 33 of the present invention provides a simple and convenient means of using a selector switch 40 to select between a fixed-speed drive controller 37 and a variable-speed drive controller 39. Such dual-controller drive assemblies 33 provide redundancy for the variable-speed drive controllers 39 that, in turn, helps facilitate early adoption of the newer variable-speed technology. Manufacturers may also offer an option with new irrigation systems 1 that are not initially equipped with variable-speed drive controllers 39 but are ready for variable-speed drive controllers 39 to be easily installed into the dual-controller drive assemblies 33 at a later time. Irrigation systems 1 utilizing variable-speed drive controllers 39 to control the speed of movement have the potential to vastly improve both irrigation system 1 performance and reliability as compared to irrigation systems 1 that only utilize the more conventional fixed-speed drive controllers 37 to control the speed of movement.

Although the subject matter has been described in language specific to structural features or process operations, it is to be understood that the subject matter defined in the appended claims is not necessarily limited to the specific features or acts described above. Rather, the specific features and acts described above are disclosed as example forms of implementing the claims.

We claim:

1. An irrigation system having a movement direction over a ground surface of a field, the irrigation system comprising:
   at least one intermediate span and at least one end span;
   a tower structure configured to support each span above a ground surface; and
   a dual-controller drive assembly of a tower structure having:
   (a) at least one wheel configured to contact a ground surface below the irrigation system;
   (b) at least one span motor configured to drive at least one wheel so as to propel the tower structure over the ground surface;
   (c) a drive controller unit configured to control power supplied to the span motor, the drive controller unit including a fixed-speed drive controller and a variable-speed drive controller; and
   (d) at least one selector switch configured to select between: (i) a first operational mode of the drive assembly characterized by the fixed-speed drive controller controlling power supplied to the motor to operate the motor and the wheel at a fixed speed to maintain a uniform movement speed of the tower structure across the ground surface; and (ii) a second operational mode characterized by the variable-speed drive controller controlling power supplied to the motor to operate the motor and the wheel at a variable speed to vary the movement speed of the tower structure across the ground surface.

2. The system of claim 1 wherein at least one selector switch is configured to be actuated manually based on manual operator input.

3. The system of claim 1 wherein at least one selector switch is configured to be actuated automatically based on automatic sensor input.

4. The system of claim 1 wherein the at least one intermediate span includes a plurality of intermediate spans with a tower structure supporting each intermediate span, each tower structure having a dual-controller drive assembly such that each tower structure has a drive controller unit and a selector switch configured to select between the fixed-speed drive controller and the variable-speed drive controller.

5. The system of claim 4 wherein at least one selector switch is configured to be actuated manually based on manual operator input.

6. The system of claim 4 wherein at least one selector switch is configured to be actuated automatically based on automatic sensor input.

7. The system of claim 1 wherein the at least one intermediate span includes a plurality of intermediate spans with a tower structure supporting each intermediate span, each tower structure having a dual-controller drive assembly such that each tower structure has a drive controller unit, with one selector switch being configured to select between the fixed-speed drive controllers and the variable-speed drive controllers of a plurality of corresponding dual-controller drive assemblies.

8. The system of claim 7 wherein at least one selector switch is configured to be actuated manually based on manual operator input.

9. The system of claim 7 wherein at least one selector switch is configured to be actuated automatically based on automatic sensor input.

10. An irrigation system having a movement direction over a ground surface of a field, the irrigation system comprising:
    at least one intermediate span and at least one end span;
    a tower structure configured to support each span above a ground surface; and
    a dual-controller drive assembly associated with each said tower structure, each dual-controller drive assembly having:
    at least one wheel configured to contact a ground surface below the irrigation system;
    at least one span motor configured to drive at least one wheel so as to propel the tower structure over the ground surface;
    a drive controller unit configured to control power supplied to the span motor, the drive controller unit including a fixed-speed drive controller and a variable-speed drive controller; and
    at least one selector switch configured to select between only two modes of operation of the drive assembly, said only two modes comprising a first said operational mode of the drive assembly and a second said operational mode of the drive assembly, the first operational mode being characterized by the fixed-speed drive controller controlling power supplied to the motor to operate the motor and the wheel at a fixed speed to maintain a uniform movement speed of the tower structure across the ground surface, the second operational mode being characterized by the variable speed drive controller controlling power supplied to the motor to operate the motor and the wheel at a variable speed to vary the movement speed of the tower structure across the ground surface.

11. The system of claim 10 wherein at least one selector switch of the dual-controller drive assembly is configured to change between the operational modes of the drive assembly by manual actuation of the switch by an operator.

12. The system of claim 10 wherein at least one selector switch of the dual-controller drive assembly is configured to change between the operational modes of the drive assembly by automatic actuation of the switch based on automatic sensor input.

13. The system of claim 10 wherein the at least one intermediate span includes a plurality of intermediate spans with a said tower structure supporting each of the intermediate spans, each of the tower structures having a said dual-controller drive assembly such that each of the tower structures has a said drive controller unit and a said selector switch configured to select between the fixed-speed drive controller and the variable-speed drive controller.

14. The system of claim 13 wherein the selector switches of the dual-controller drive assemblies are configured to change between the operational modes of the drive assemblies by manual actuation of the switches by an operator.

15. The system of claim 13 wherein the selector switches of the dual-controller drive assemblies are configured to change between the operational modes of the drive assemblies by automatic actuation of the switches based on automatic sensor input.

16. An irrigation system having a movement direction over a ground surface of a field, the irrigation system comprising:
    an end span and a plurality of intermediate spans;
    a plurality of tower structures with each said tower structure supporting one of said spans above a ground surface; and a plurality of dual-controller drive assemblies with each tower structure having a said drive assembly, each said dual-controller drive assembly having:
  at least one wheel configured to contact a ground surface below the irrigation system;
  at least one span motor configured to drive at least one wheel so as to propel the tower structure over the ground surface;
  a drive controller unit configured to control power supplied to the span motor, the drive controller unit including a fixed-speed drive controller and a variable-speed drive controller; and
  at least one selector switch configured to select a first operational mode of the drive assembly or a second operational mode of the drive assembly, the first operational mode being characterized by the fixed-speed drive controller controlling power supplied to the motor to operate the motor and the wheel at a fixed speed to maintain a uniform movement speed of the tower structure across the ground surface, the second operational mode being characterized by the variable speed drive controller controlling power supplied to the motor to operate the motor and the wheel at a variable speed to vary the movement speed of the tower structure across the ground surface.

* * * * *